US011122442B2

(12) United States Patent
Li et al.

(10) Patent No.: US 11,122,442 B2
(45) Date of Patent: Sep. 14, 2021

(54) TRANSFERRING COVERAGE ENHANCEMENT INFORMATION FROM TERMINAL ADAPTER TO TERMINAL EQUIPMENT

(71) Applicants: AT&T Intellectual Property I, L.P., Atlanta, GA (US); AT&T Mobility II LLC, Atlanta, GA (US)

(72) Inventors: Yunpeng Li, Austin, TX (US); Jerry Jun, Austin, TX (US); Robert Holden, Allen, TX (US); Tjoen Kusardi, Sammamish, WA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 69 days.

(21) Appl. No.: 16/215,867

(22) Filed: Dec. 11, 2018

(65) Prior Publication Data
US 2020/0187015 A1 Jun. 11, 2020

(51) Int. Cl.
*H04W 16/18* (2009.01)
*H04W 24/02* (2009.01)
*H04W 16/26* (2009.01)

(52) U.S. Cl.
CPC .......... *H04W 16/18* (2013.01); *H04W 16/26* (2013.01); *H04W 24/02* (2013.01)

(58) Field of Classification Search
CPC ...... H04W 16/18; H04W 16/26; H04W 24/02
(Continued)

(56) References Cited

U.S. PATENT DOCUMENTS 7,907,952 B2  3/2011  Lee et al.
8,121,045 B2  2/2012  Cai et al.
(Continued)

FOREIGN PATENT DOCUMENTS

EP     2534764 A1    12/2012
WO  2011100548 A1     8/2011
(Continued)

OTHER PUBLICATIONS

Vikram, et al., "Quality of Service aware Dynamic Source Routing Protocol in Ad hoc Networks: Proposal, Analysis and Comparison," Computer Engineering and Intelligent Systems www.iiste.org ISSN 2222-1719 (Paper) ISSN 2222-2863 (Online) vol. 2, No. 4, 2011, 12 pages.

(Continued)

*Primary Examiner* — Charles N Appiah
*Assistant Examiner* — Frank E Donado
(74) *Attorney, Agent, or Firm* — Amin, Turocy & Watson, LLP

(57) ABSTRACT

The described technology is generally directed towards transferring coverage enhancement information from a terminal adapter to a terminal equipment. In one aspect, a terminal equipment can send a communication command to a terminal adapter requesting return of coverage enhancement information, and receive the coverage enhancement information from the terminal adapter. The terminal equipment provides access to the coverage enhancement information to a program running on the terminal equipment. In another aspect, a terminal adapter activates coverage enhancement information reporting, and sends coverage enhancement information to a terminal equipment. The terminal adapter monitors for a coverage enhancement state change.

20 Claims, 12 Drawing Sheets

(58) Field of Classification Search
USPC .......................................................... 455/446
See application file for complete search history.

(56) References Cited

U.S. PATENT DOCUMENTS

| | | | |
|---|---|---|---|
| 8,467,380 | B2 | 6/2013 | Zhou et al. |
| 8,737,514 | B2 | 5/2014 | Davydov et al. |
| 8,750,152 | B2 | 6/2014 | Koo et al. |
| 8,750,917 | B2 | 6/2014 | Xu et al. |
| 8,792,376 | B2 | 7/2014 | Jang et al. |
| 8,934,336 | B2 | 1/2015 | Ramachandran et al. |
| 9,154,352 | B2 | 10/2015 | Palanki et al. |
| 9,398,475 | B2 | 7/2016 | Zhang et al. |
| 9,398,559 | B2 | 7/2016 | Davydov et al. |
| 9,461,805 | B2 | 10/2016 | Kim et al. |
| 9,544,860 | B2 | 1/2017 | Laroia et al. |
| 9,572,168 | B2 | 2/2017 | Bergstrom et al. |
| 9,674,727 | B2 | 6/2017 | Damnjanovic et al. |
| 9,735,844 | B2 | 8/2017 | Chen et al. |
| 9,807,690 | B2 | 10/2017 | Rudolf et al. |
| 9,872,245 | B2 | 1/2018 | Kazmi et al. |
| 9,913,156 | B2 | 3/2018 | Xu et al. |
| 2011/0217985 | A1 | 9/2011 | Gorokhov |
| 2013/0051261 | A1 | 2/2013 | Kazmi et al. |
| 2013/0148535 | A1 | 6/2013 | Baghel et al. |
| 2015/0172974 | A1* | 6/2015 | Liu ................... H04W 36/0083 370/331 |
| 2016/0014646 | A1 | 1/2016 | Yiu et al. |
| 2016/0337931 | A1* | 11/2016 | Wang ................ H04W 36/0083 |
| 2017/0223581 | A1 | 8/2017 | A et al. |
| 2017/0311355 | A1* | 10/2017 | Yl ......................... H04L 5/0053 |
| 2018/0097541 | A1 | 4/2018 | Bhattad et al. |
| 2018/0376427 | A1* | 12/2018 | Arzelier ................ H04W 4/027 |
| 2019/0239170 | A1* | 8/2019 | Thangarasa ........... H04W 16/18 |
| 2020/0068472 | A1* | 2/2020 | Kumar .................. H04W 36/24 |

FOREIGN PATENT DOCUMENTS

| | | |
|---|---|---|
| WO | 2016149920 A1 | 9/2016 |
| WO | 2018085668 A1 | 5/2018 |

OTHER PUBLICATIONS

Hou, et al., "Performance Impacts of Erroneous Channel Predictions on Packet Scheduling in Wireless Networks," Last Accessed: Jan. 15, 2019, 6 pages.

Kumar, et al., "Measuring Parameters for speech quality in cellular networks," Last Accessed: Jan. 15, 2019, 6 pages.

Love, et al., "An Overview of Limited Feedback in Wireless Communication Systems," IEEE Journal on Selected Areas in Communications, vol. 26, No. 8, Oct. 2008, 25 pages.

* cited by examiner

TRANSFERRING COVERAGE ENHANCEMENT INFORMATION FROM TERMINAL ADAPTER TO TERMINAL EQUIPMENT

TECHNICAL FIELD

The subject application is related to wireless communication systems, and, for example, to providing access to coverage enhancement information to terminal equipment.

BACKGROUND

In wireless communication systems, particularly in new radio (NR, sometimes referred to as 5G), coverage enhancement (CE) provides substantial coverage gain, e.g., on the order of greater than fifteen decibels for Category M1 (CAT-M1) devices. As a result, coverage enhancement is expected to be adopted by billions of devices, including those such as, machine type communication (MTC) devices, CAT M1, LTE (Long-Term Evolution), Narrowband Internet of Things (NB-IoT) and 5G massive IoT.

Repetition is one way to enhance coverage, that is, to schedule a data block multiple times to improve the likelihood of at least one repeated data block being correctly received. A terminal equipment of a wireless device can benefit from knowing the coverage enhancement information.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
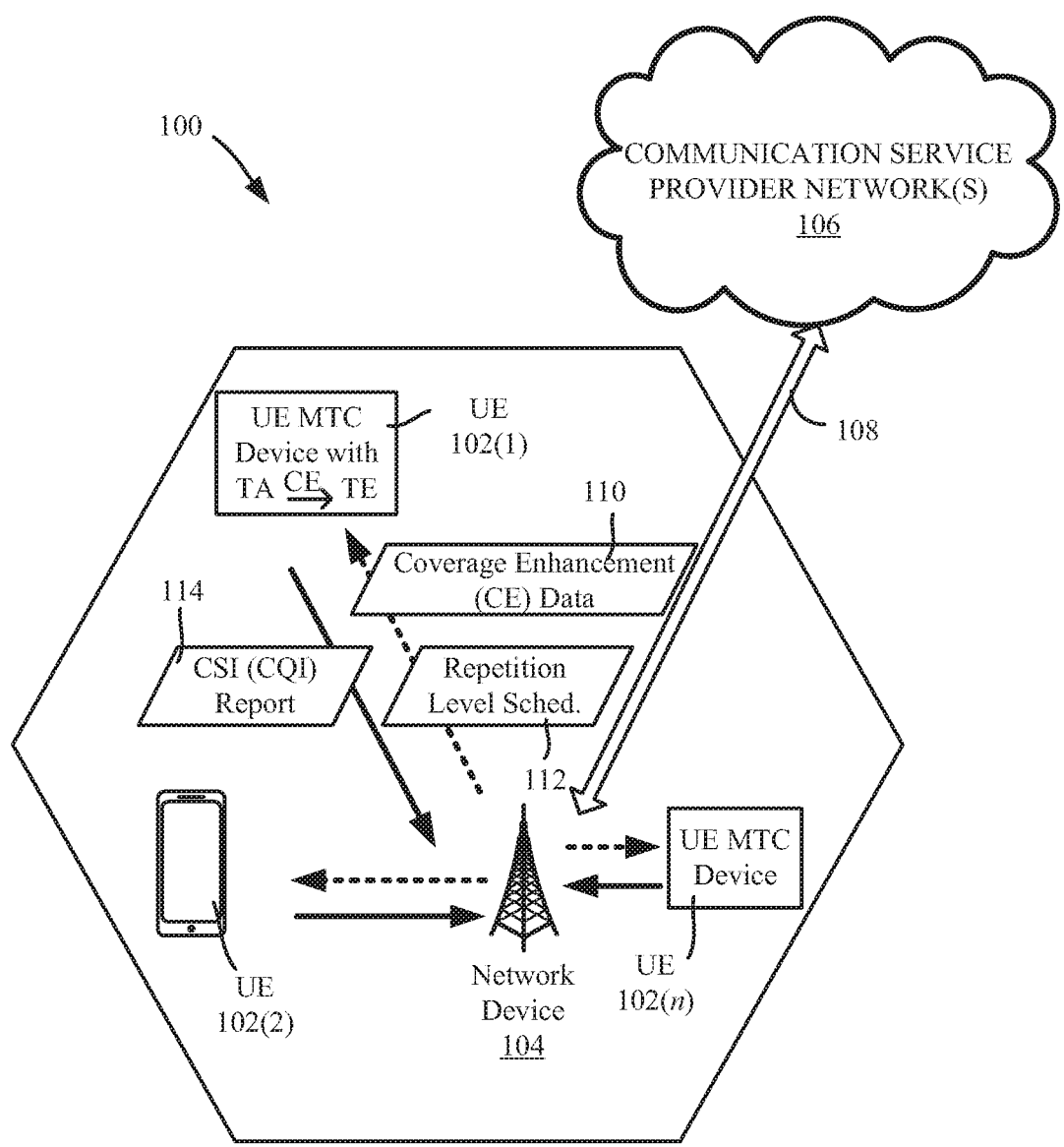
FIG. 1 illustrates an example wireless communication system in which a network node device (e.g., network node) uses coverage enhancement (CE) in conjunction with a user equipment (UE) that transfers the coverage enhancement information between a terminal adapter (TA) and a terminal equipment (TE) of the UE, in accordance with various aspects and implementations of the subject disclosure.

Briefly, one or more aspects of the technology described herein are generally directed towards transferring coverage enhancement (CE) information from a terminal adapter (TA, alternatively spelled terminal "adaptor") to a terminal equipment (TE). In general and as used herein, a terminal adapter comprises an interface to a wireless network, and can include chipsets, modems, modules, and/or other emerging devices that, for example, support LTE, CAT-M1, NB-IoT, 5G massive IoT and the like. As also used herein, a terminal equipment comprises any machine (e.g., computer, device, application processor and the like) that uses a terminal adapter to access wireless/cellular services. In general, a terminal adapter and a terminal equipment are incorporated into a mobile equipment device (e.g., that operates as a user equipment device once associated with a subscriber identity).

As is understood, from time to time, a suitably equipped network device can decide to use coverage enhancement, e.g., schedule user equipment communications using a repetition level, such as based on a channel quality indicator report. In general, there is a tradeoff between repetition and throughput, so the better the channel quality, the less coverage enhancement such as repetition (if any) is used, while the worse the channel quality, the more that coverage enhancement (e.g., repetition of a transmission) helps ensure the reception of that transmission.

At present, a terminal equipment has no visibility to the coverage enhancement information in use by a network device with respect to the terminal equipment's user equipment, generally because there is no known technology for a terminal adapter of that user equipment to send the information to the terminal equipment. Described herein is a technology for providing the terminal equipment with the latest coverage enhancement information, whereby the terminal equipment (e.g., one or more programs running thereon) can then use the coverage enhancement information to make intelligent decisions. For example, a program running on the terminal equipment can forward the coverage enhancement information to a user interface to help troubleshoot device and network issues. As another example, a program running on the terminal equipment can forward the coverage enhancement information to one or more backend systems to improve device/network management and planning.

In one or more implementations, transferring coverage enhancement information from the terminal adapter to the terminal equipment can be accomplished through text string extensions, e.g., to the AT (ATtention) command interface, originally used to control modems, but at present still widely supported, including by GSM/GPRS modems and mobile phones. In alternative implementations, more dedicated/proprietary programming interfaces (e.g., application programming interfaces) and the like can be used to transfer coverage enhancement information from the terminal adapter to the terminal equipment.

In one aspect, the terminal equipment can enable and disable the reporting of coverage enhancement information from the terminal adapter. In one or more implementations, when first enabled (from a disabled or off state), the terminal adapter replies/responds to an "enable"-type command, including by reporting the current coverage enhancement information. Thereafter, in one or more implementations, while enabled the terminal adapter monitors for changes to the coverage enhancement information, and reports (unsolicited) to the terminal equipment whenever a change to the coverage enhancement information is detected.

It should be understood that any of the examples and terms used herein are non-limiting. For instance, examples can be based on New Radio (NR, sometimes referred to as 5G) communications between a user equipment exemplified as a machine type communication device or the like and network device; however virtually any communication system may benefit from the technology described herein, and/or their use in different spectrums may likewise benefit. As another example, while machine type communication devices are examples of such wireless devices, the technology is not limited to machine type communication devices; but rather any wireless-capable user equipment may benefit from the technology described herein, including, wearables, smartphones, tablets, notebooks, modems (cards, dongles/adapters (e.g., USB)) and so on. Indeed, any communication system capable of using coverage enhancement such as repetition may benefit from the technology described herein. Still further, examples are described with respect to extending the AT command interface with text commands to support coverage enhancement reporting; however any technology that allows for communication of coverage enhancement information between a terminal adapter and a terminal equipment may be implemented. Thus, any of the examples herein are non-limiting examples, and any of the embodiments, aspects, concepts, structures, functionalities or examples described herein are non-limiting, and the technology may be used in various ways that provide benefits and advantages in wireless radio communications in general.

FIG. 1 illustrates an example wireless communication system 100 in accordance with various aspects and embodiments of the subject technology. In one or more embodiments, the system 100 can comprise one or more user equipment, e.g., UEs 102(1)-102(n). The user equipments 102(1)-102(n) exemplified in FIG. 1 (and FIG. 2) can be any combination of category(ies) of machine type communication (MTC) device(s), cell phones, wearables, and so on.

In various embodiments, the system 100 is or comprises a wireless communication network serviced by one or more wireless communication network providers. In example embodiments, user equipments (UEs, collectively 102) can be communicatively coupled to the wireless communication network via a network device 104 (e.g., network node). The network device 104 can communicate the UEs 102, thus providing connectivity between the UEs 102 and the wider cellular network.

In example implementations, each UE such as the UE 102(1) is able to send and/or receive communication data via a wireless link to the network device 104. The dashed arrow lines from the network device 104 to the UEs 102 represent downlink (DL) communications and the solid arrow lines from the UEs 102 to the network devices 104 represents uplink (UL) communications.

The system 100 can further include one or more communication service provider networks 106 that facilitate providing wireless communication services to various UEs, including UES 102(1)-102(n), via the network device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., the UEs 102 and the network device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

In FIG. 1, as described herein, a user equipment (e.g., 102(1)) is configured to receive coverage enhancement data 110 from the network device 104. For example, the coverage enhancement can correspond to repetition level scheduling 112 from the network device 104, such as in response to a channel quality indicator report 114, (which can be part of a larger channel state information, or CSI report, send periodically and/or on demand from the network device 104 (e.g., requested via block 114). As will be understood, the user equipment device 102(1) is configured with the technology described herein that transfers coverage enhancement information corresponding to the coverage enhancement data 110 from the terminal adapter (TA) of the user equipment 102(1) to the terminal equipment (TE) of the user equipment 102(1). Note that in the example of FIG. 1, the network device 104 corresponds to a (current) serving cell that supports coverage enhancement; as will be understood, coverage enhancement reporting can report a serving cell that does support coverage enhancement. Further note that one or more of the other exemplified UEs 102(2)-102(n) can similarly support the transfer of coverage enhancement information from its terminal adapter to its terminal equipment.

Note that instead of (or in addition to) CQI report-based adaptive repetition level scheduling, hybrid automatic repeat request (HARQ) feedback-based adaptive repetition level scheduling can be used. By way of example, consider that when a data block is communicated to a user equipment, the HARQ feedback (acknowledgment or negative acknowledgment) that is received can be used to decide whether to increase or decrease the repetition level; (it is also feasible to leave the repetition level as is). In any event, the repetition level as described herein can be applied to uplink and/or downlink communications, and there can be a different uplink repetition level relative to the downlink repetition level. Indeed, the technology described herein that provides coverage enhancement (including repetition) information can be applied to any/all physical channels; for example, for random access channels, repetition level technology can help minimize the initial acquisition time. For physical downlink or uplink channels, repetition level technology can work to maximize throughput while achieving the required coverage.

Figure 2:
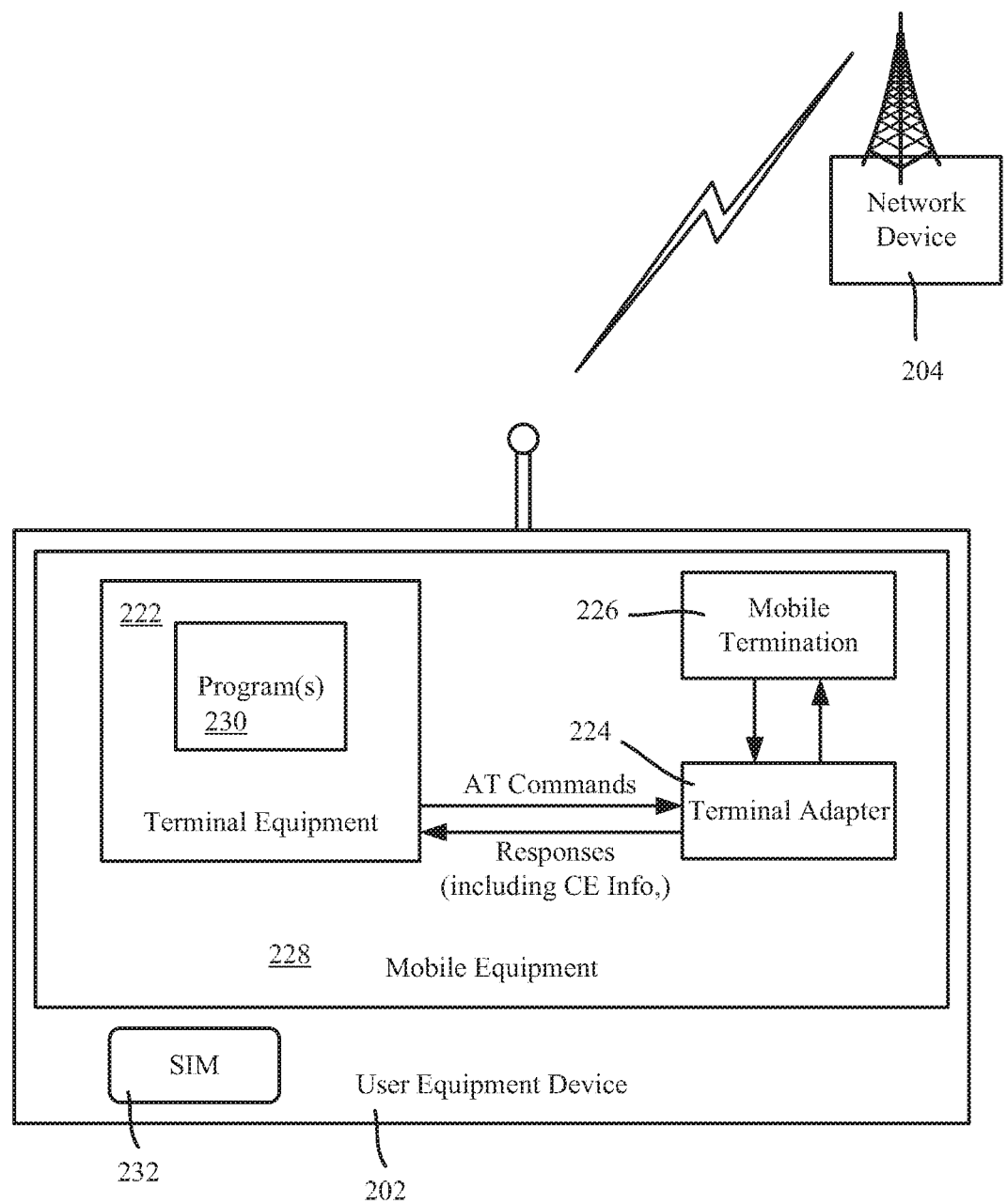
FIG. 2 illustrates an example user equipment device in which a terminal adapter transfers CE information, obtained from a network device, to a terminal equipment, in accordance with various aspects and implementations of the subject disclosure.

FIG. 2 represents an example user equipment device 202 wirelessly coupled to a network device 204. In the example of FIG. 2, the user equipment 202 comprises a terminal equipment 222 communicatively coupled to a terminal adapter 224, which in turn is communicatively coupled to a mobile termination component 226. As is generally understood, the terminal equipment 222, terminal adapter 224, and mobile termination component 226 (the components for standard mobile terminal functions) can be considered a mobile equipment 228; the terminal adapter 224 serves as the interface between the terminal equipment 222 and the mobile termination component 226. The terminal equipment 222 runs one or more programs 230, comprising software, firmware and/or hardcoded instructions executed on a processor of the terminal equipment 222.

Thus, as is conventionally understood, a mobile equipment 228 includes the terminal equipment 222, the terminal adapter 224, the mobile termination 226. When coupled to a subscriber identity module 232 (SIM, such as via a SIM card or a SIM embedded into a smaller device such as a sensor), the mobile equipment 228 can be considered an functional user equipment, that is, an operational user equipment device 202. Note that any or all of the components of FIG. 2 may be separate as depicted in the example of FIG. 2, or alternatively combined at least in part, integrated into one or more larger component(s), partially integrated, and so on.

As represented in the example of FIG. 2, the terminal equipment 222 can communicate with the terminal adapter 224, such as via (but not limited to) AT commands sent using the AT command interface/protocol. As described herein, the terminal adapter 224 responds to such commands, including to transfer coverage enhancement (CE) information to the terminal equipment 222. This facilitates access to the current coverage enhancement information to the one or more programs 230 that are running (or can be run) on the terminal equipment 222.

It should be understood that FIG. 2 is only one example of a wireless device capable of implementing the technology described herein. Indeed, the technology described herein can, for example, comprise as a terminal device a computer system, server, facsimile machine, tablet, laptop, handheld device and so on, any of which can be communicatively coupled to an internal terminal adapter, but alternatively can be communicatively coupled to an external terminal adapter (rather than have both be part of an integrated device). Moreover, the terminal adapter can be coupled to a network in any way, including by wired or wireless link(s).

Figure 3:
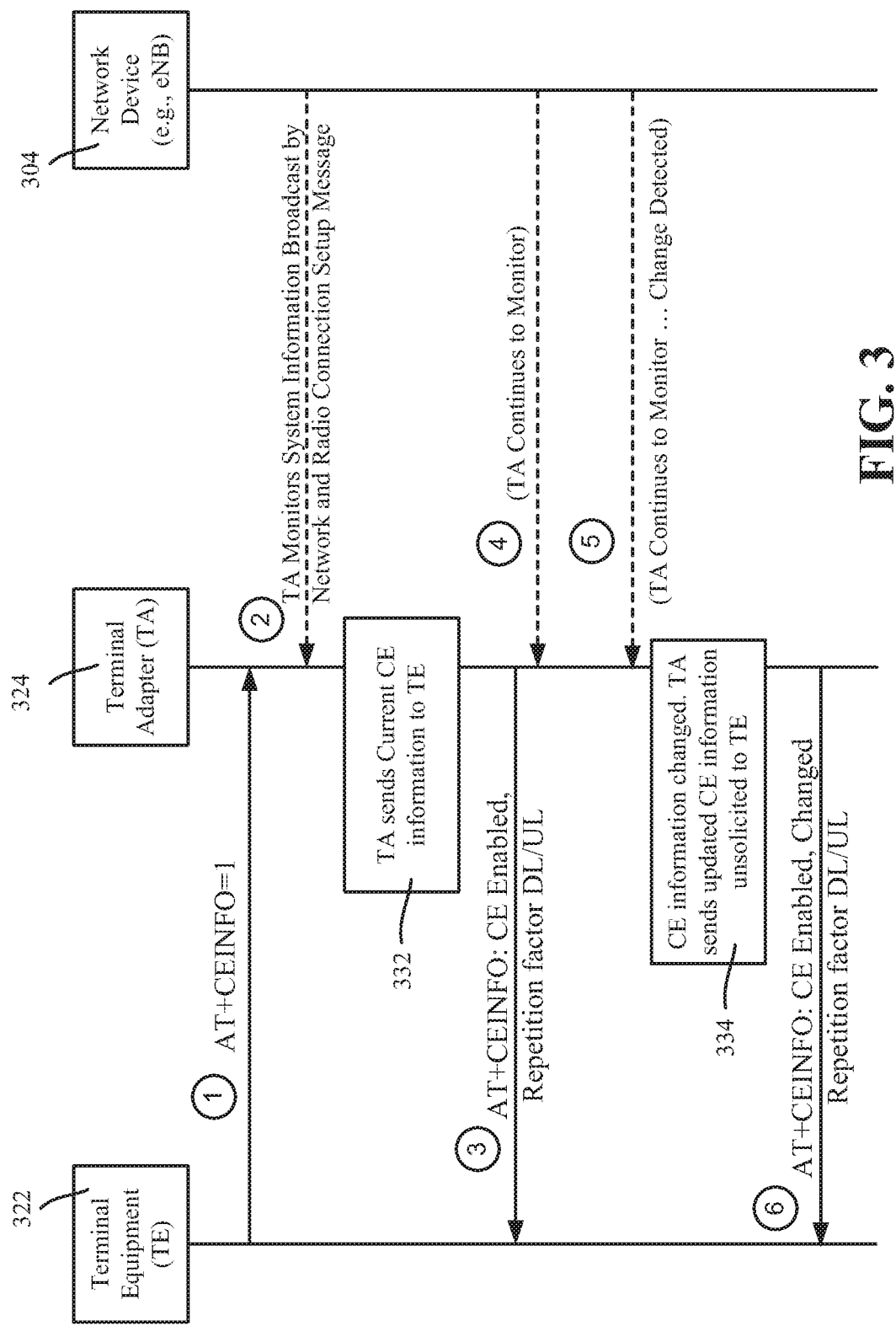
FIG. 3 is an example timing/dataflow diagram illustrating how a terminal equipment, terminal adapter and network device communicate such that the terminal equipment obtains current CE information, in accordance with various aspects and implementations of the subject disclosure.

FIG. 3 is an example timing/dataflow diagram showing how a terminal equipment 322 and a terminal adapter 324, along with a network device 304 (e.g., an eNB), operate to provide the terminal equipment 322 with coverage enhancement information. As set forth above with reference to FIG. 2, this provides program(s) on the terminal equipment with access to the coverage enhancement information.

One or more aspects of the technology described herein comprises a suitable AT command and reply/response communication exchange, defined in one implementation as "AT+CEINFO." The set command (AT+CEINFO=0/1) is used to enable/disable reporting, including unsolicited reporting, where +CEINFO (0=Disable, 1=Enable). It should be noted that in one or more implementations, the first report (e.g., following initial startup or after an "Enable" command when previously in the disabled state) of the coverage enhancement information is requested, while thereafter, coverage enhancement information is returned by the terminal adapter 324 unsolicited (without a direct request), such as whenever a change to the coverage enhancement occurs. However, alternative implementations can, for example, enable coverage enhancement reporting by default (e.g., initially assume the "Enable" command unless and until disabled. Moreover, the technology provides for querying for a (solicited) report, on demand, independent of whether coverage enhancement has changed.

The following describes one implementation of AT commands that can be used to retrieve coverage enhancement (CE) mode information based on the syntax comprising Set command: +CEINFO=0/1. The Set command is used to enable/disable the unsolicited reporting according to: +CEINFO (0=Disable, 1=Enable).

A suitable response is: OK Unsolicited report: +CEINFO: <Reporting>, <CE Enabled>, <UE State>, <Downlink Repetition Factor>, <Uplink Repetition Factor>, <RSRP> <CINR>. These variables are described below.

In one or more implementations, when +CEINFO=1 is received, a report +CEINFO is sent as soon as available right away to indicate the current status. After the initial report, an unsolicited report is sent in response to any of the following events:

<CE Enabled> is changed
<UE State> is changed
<Downlink Repetition Factor> is changed
<Uplink Repetition Factor> is changed In one implementation, the result, whether initial or unsolicited, uses the result code: +CEINFO: Reporting [0/1], Enabled [0/1], UE State [I/R/C], downlink repetition factor, uplink repetition factor, RSRP (reference signal received power data) and CINR (carrier to interference plus noise ratio data).

The "<Reporting>:" state value indicates if the unsolicited report for CE Mode is enabled or disabled; (0=Disabled, 1=Enabled). The "<CE Enabled>" indicates whether the serving cell supports CE mode A/B; (1=Enabled, 0=Disabled, where CE mode A is for moderate deep coverage enhancement, and CE mode B provides extremely deep coverage). The "<UE State>" parameter value indicates the user equipment state at the time of the report (I=Idle, R=RACH (random-access channel), C=Connected).

The "<Downlink repetition factor>" parameter indicates the downlink repetition factor in use. If <UE state> is Idle or RACH, the downlink repetition factor is set to mpdcch-NumRepetition according to current radio condition (i.e. RSRP) and prach-ParametersListCE-r13 (in SIB2, System Information Block Type 2; where "mpdcch" is an acronym for "MTC Physical Downlink Control Channel" and "prach" is an acronym for "physical random-access channel") if the access technology is LTE-M; otherwise the downlink repetition factor is set to npdcch-NumRepetitions according to the current radio condition and NPRACH-Parameters-NB-r13 in SIB2-NB if access technology is NB-IoT, (where npdcch stands for Narrowband Physical Downlink Control Channel and NPRACH stands for NB-IoT physical random access channel). If <UE state> is Connected, the downlink repetition factor is set to mpdcch-NumRepetition for the radio bearer if the access technology is LTE-M; otherwise the downlink repetition factor is set to npdcch-NumRepetitions for the radio bearer if the access technology is NB-IoT.

The "<Uplink Repetition Factor>" value indicates the current uplink repetition factor; if the <UE state> is Idle, uplink repetition factor is set to numRepetitionPerPreamble-Attempt according to the current radio condition. If the <UE state> is RACH, the uplink repetition factor is set to numRepetitionPerPreambleAttempt selected by UE. If the <UE state> is Connected, the uplink repetition factor is set to the repetition number for PUSCH (physical uplink control channel) if the access technology is LTE-M; the uplink repetition factor is set to the repetition number for NPUSCH (NB-IoT physical uplink shared channel) if the access technology is NB-IoT.

The technology described herein can quantify repetition based on user equipment states, that is, the states of Idle, RACH, Connected. To this end, repetitions, which are dynamic, can be re-evaluated across state transitions; (note that a stateless definition of the repetition factor is not sufficient to analyze coverage enhancement impacts). This can be achieved by mapping downlink/uplink repetition factors to instantaneous physical layer parameters of the network/user equipment (e.g., mpdcch-NumRepetition, numRepetitionPerPreambleAttempt, repetition number for PUSCH) during the states of Idle, RACH, Connected. The mapping of downlink/uplink repetition factors to instantaneous physical layer parameters thus facilitates determining repetition reporting by a terminal adapter. Thus, upon receiving user equipment state data indicating whether a user equipment is in a connected state, an idle state or a random access channel procedure state, a state transition can be determined based on the user equipment state data relative to a previous state of the user equipment. The state transition can trigger the mapping of a (downlink and/or uplink) repetition factor to device (network and/or user equipment) physical layer parameters based on the user equipment state data.

The RSRP value represents the current RSRP level at the time of the report, comprising a numerical range in dBm (decibels milliwatts). The CINR value returns the current CINR level at the time of the report, similarly comprising a numerical range in dBm.

In one implementation, the AT command syntax also provides a Query command, "+CEINFO?" that returns the current CE Mode Information. A suitable response is +CEINFO: <Reporting>, <CE Enabled>, <UE State>, <Downlink Repetition Factor>, <Uplink Repetition Factor>, <RSRP>, <CINR>.

It should be noted that coverage enhancement is not limited to repetition, and, for example, can also include concepts such as modified transmission power, cross subframe and resource block channel estimation, multiple subframe frequency hopping, redundancy version cycling, redundancy version reuse and scrambling for subframes, power boosting and so on. As is understood, the technology described herein can be extended in a straightforward way to report any coverage enhancement technique(s) in use, along with corresponding value(s) for each such coverage enhancement technique.

Returning to FIG. 3, using the above command and reply definitions, the terminal equipment 322 enables CEINFO reporting by sending "AT+CEINFO=1" to the terminal adapter 324, as represented in FIG. 3 by that arrow accompanied by circled numeral one (1). The terminal adapter 324 checks the coverage enhancement status by monitoring system information broadcast by the network device 304 (e.g., eNB) and the radio connection setup message, as represented by circled numeral two (2).

When received, the terminal adapter 324 sends the current status to the terminal equipment 322 through an AT+CEINFO reply, as represented in FIG. 3 by the arrow labeled with numeral three (3) and block 332. Note that although not explicitly shown in FIG. 3, a Query command "+CEINFO?" can be handled as generally represented by the arrows labeled (1)-(3).

As represented in FIG. 3 by the arrow labeled with circled numeral four (4), the terminal adapter 324 continues to monitor the coverage enhancement status provided by the network device 304. As represented by arrow/circled numeral five (5), whenever the coverage enhancement status changes, the terminal adapter 324 sends the latest coverage enhancement status to terminal equipment 322 through an unsolicited AT+CEINFO reply, as represented by arrow/circled numeral six (6) and block 334.

Figure 4:
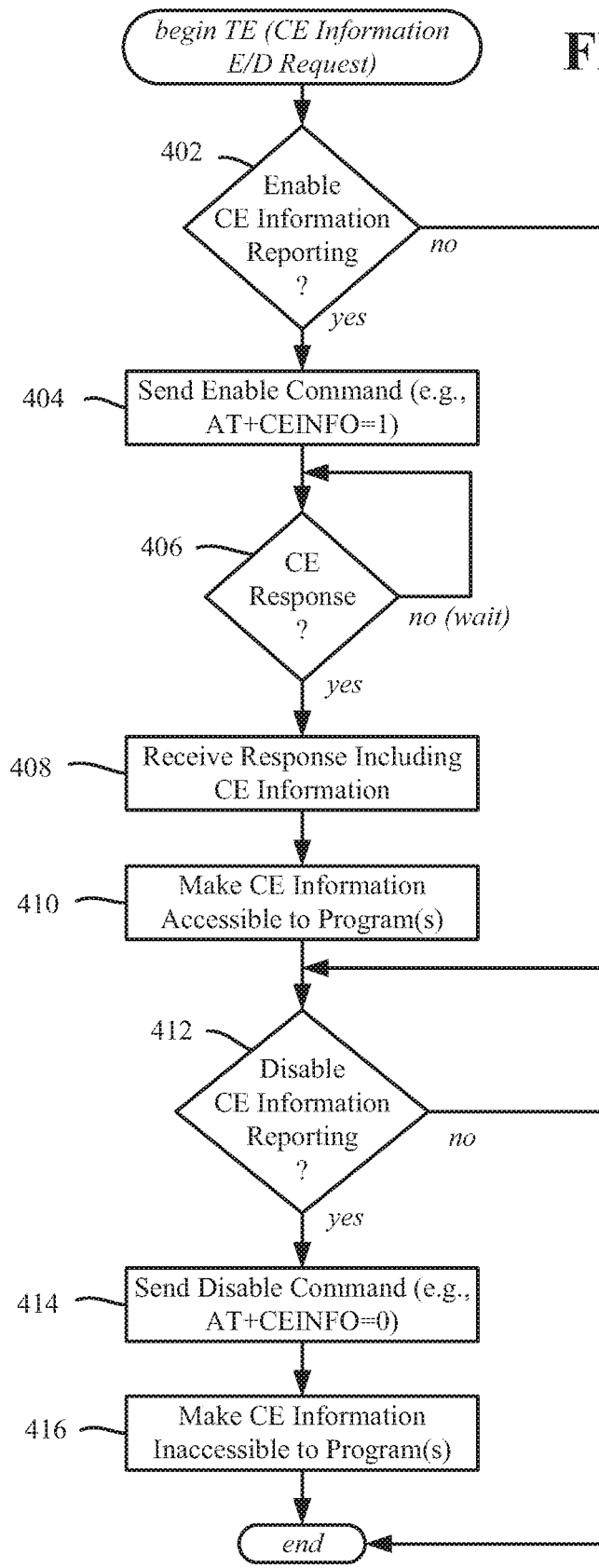
FIG. 4 is a flow diagram of example terminal equipment operations for enabling reporting of coverage enhancement information by a terminal adapter, and obtaining coverage enhancement information in response, in accordance with various aspects and implementations of the subject disclosure.

FIG. 4 is a flow diagram of example operations that can be performed by a terminal equipment with respect to enabling or disabling coverage enhancement reporting, such as if a program is requesting coverage enhancement information, by default on startup, in response to a network request, and so forth. In general, operation 402 represents evaluating whether coverage enhancement reporting is to be enabled.

If coverage enhancement reporting is to be enabled, operation 404 sends the CE enable command to the terminal adapter, e.g., AT+CEINFO=1 in an AT command implementation. Operation 406 represents waiting for the reply/response, which (assuming no error occurs) is received at operation 408. Once received, operation 410 makes the coverage enhancement information accessible to one or more programs. Note that the terminal equipment can provide access via a reply to a call/request/query from a program, or can place the current information in a suitable data storage (e.g., memory location) that program(s) can access as needed.

Note that operations 402 and 404 can be modified to send a one-time query command for the coverage enhancement information. If so, it is feasible to have a scenario in which coverage enhancement reporting is not enabled, but only is wanted on demand. To this end, a query command can be its own one time command that does not enable unsolicited coverage enhancement reporting thereafter, or alternatively a query can be accomplished by an enable command followed by, once the report is received, a disable command. A query can be independent of the enable or disable state, that is, report the coverage enhancement information and thereafter leave enabled if presently enabled, or leave disabled if presently disabled.

In any event, operation 412 represents evaluating whether coverage enhancement information reporting is to be disabled. As is understood, disabling coverage enhancement information reporting can be more efficient at times, such as if currently operating in a cell that does not support coverage enhancement. If coverage enhancement information reporting is to be disabled, operation 414 sends the disable command. Operation 416 is an optional operation that can be performed to make the coverage enhancement information inaccessible to programs or to indicate that the information may be invalid, such as if such coverage enhancement information would be outdated/misleading. Performing a callback, sending an event/notification and/or clearing the information/setting a flag indicating the coverage enhancement information may be outdated are possible options for operation 416.

Figure 5:
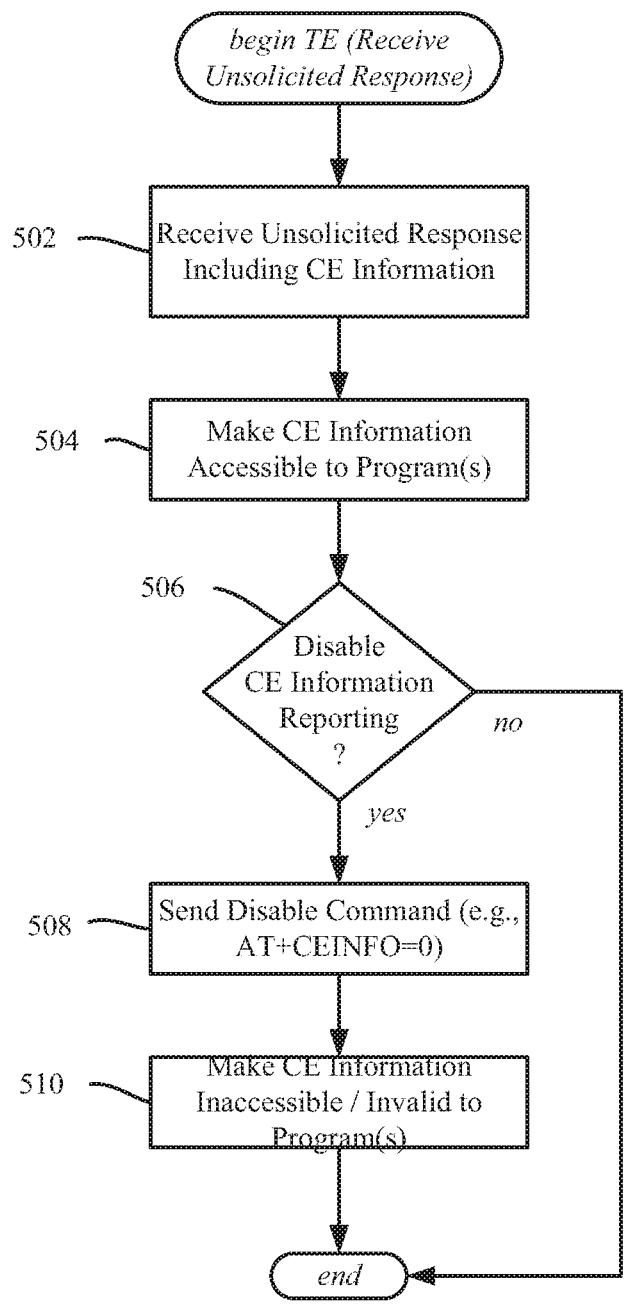
FIG. 5 is a flow diagram of example terminal equipment operations when unsolicited coverage enhancement information is received from a terminal adapter, in accordance with various aspects and implementations of the subject disclosure.

FIG. 5 is a flow diagram of example operations that can be performed by a terminal equipment with respect to receiving (operation 502) an unsolicited coverage enhancement report, which in one or more implementations occurs upon a change to coverage enhancement, as described herein. Operation 504 represents making the coverage enhancement information accessible to programs, such as via a callback, or placing in a suitable storage location; (an event or the like can be sent to the program(s) if notification is desired so that the program(s) can look up the updated information; if a program accesses the information each time needed, then such a notification may not be needed).

Operation 506 represents evaluating whether coverage enhancement information reporting is to be disabled. As is understood, disabling coverage enhancement information reporting can be more efficient at times, such as if no program has registered (or is no longer registered) to receive such information. If coverage enhancement information reporting is to be disabled, operation 508 sends the disable command. Operation 510 is an optional operation that can be performed to make the coverage enhancement information inaccessible to programs or to indicate that the information may be invalid, such as if such coverage enhancement information would be outdated/misleading. Performing a callback, sending an event/notification and/or clearing the information/setting a flag indicating the coverage enhancement information may be outdated are possible options for operation 510.

Figure 6:
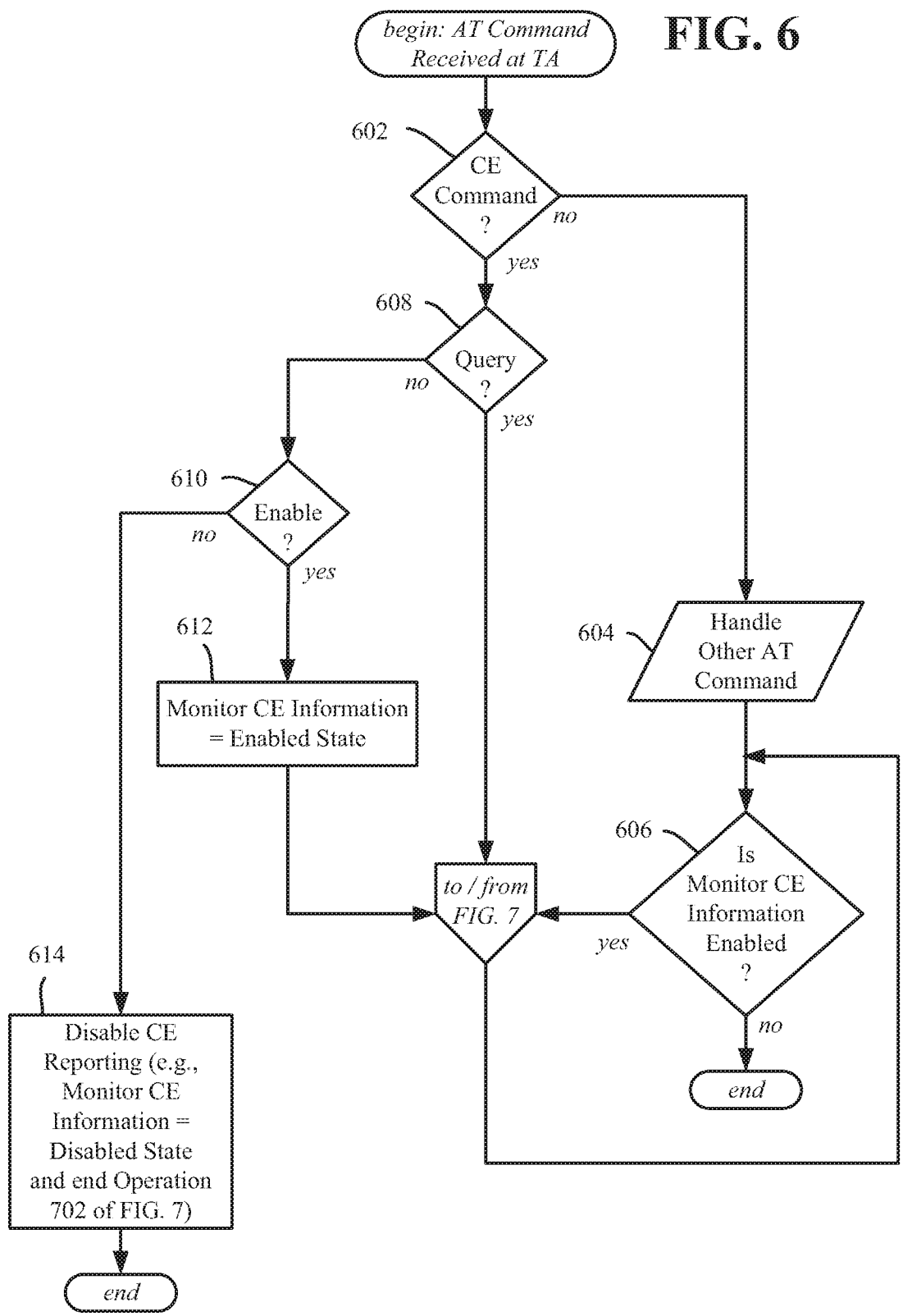
FIGS. 6 and 7 illustrate an example flow diagram of terminal adapter operations with respect to monitoring and reporting coverage enhancement information, in accordance with various aspects and implementations of the subject disclosure.
Figure 7:
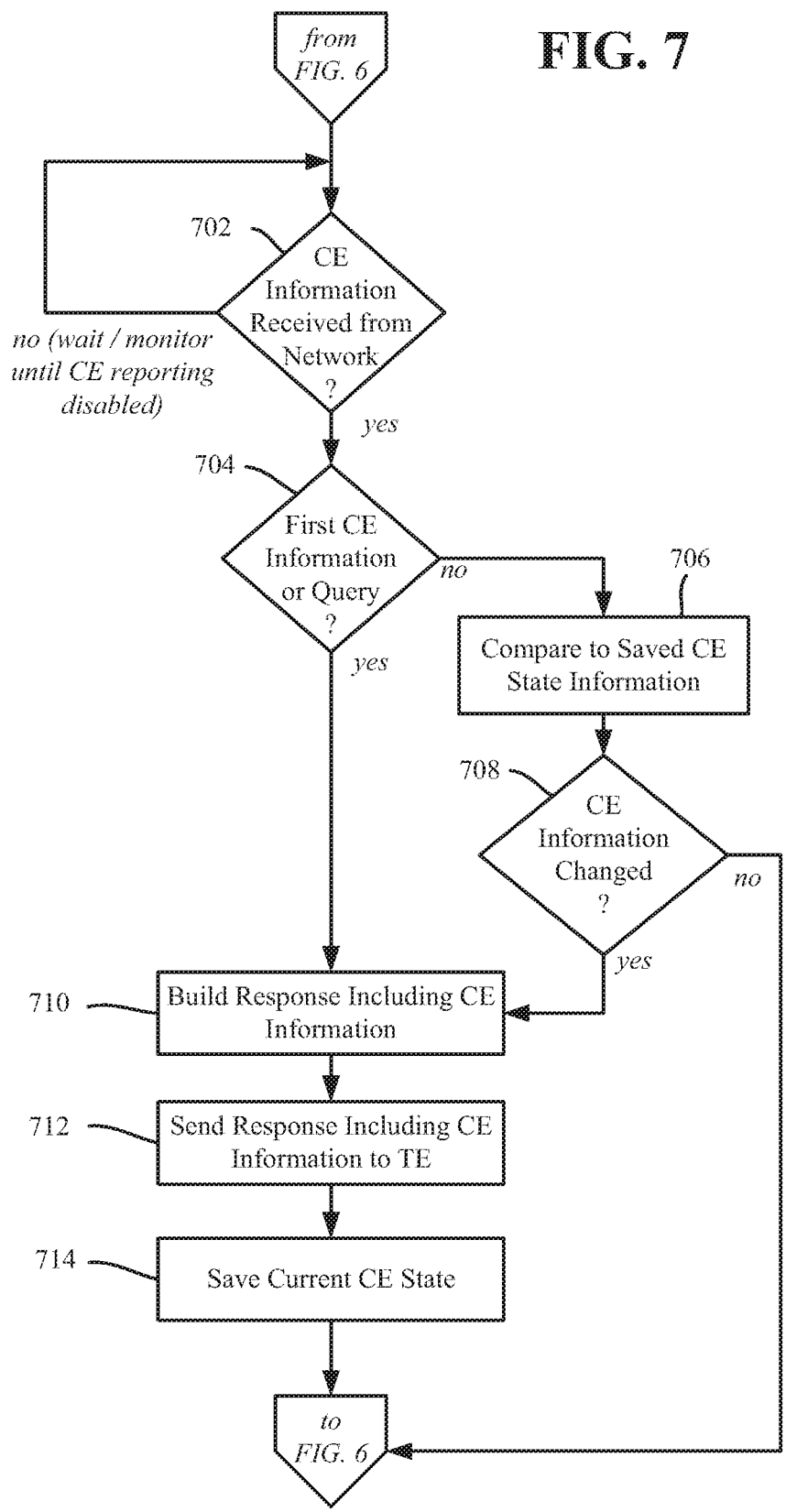

FIGS. 6 and 7 comprise a flow diagram of example operations for a terminal adapter with respect to handling an AT command, and in the particular example of FIGS. 6 and 7, a coverage enhancement command. At operation 602, the received command is evaluated to determine whether it is a coverage enhancement command. If not, operation 602 represents handling the AT command otherwise, e.g., in a conventional manner. Thereafter, operation 606 ends the process if coverage enhancement information reporting is not enabled, or continues monitoring for coverage enhancement information changes at operation 702 of FIG. 7 if enabled.

If instead the command evaluated at operation 602 is a coverage enhancement command, then operation 608 evaluates the command to determine whether the command is a query command. If so, operation 608 branches to operation 702 of FIG. 7 to obtain the coverage enhancement report, as described herein.

If not a query command at operation 608, operation 610 evaluates whether the coverage enhancement command is an Enable command. If so, operation 612 turns on monitoring, and branches to operation 702 of FIG. 7 to obtain the coverage enhancement report, as described herein.

Otherwise, in this example, the coverage enhancement command is a disable command. This turns off monitoring at operation 614. Note that other coverage enhancement commands are feasible in alternative implementations, e.g., suspend monitoring, turn on monitoring if a new cell is entered and so forth, but are not exemplified herein.

FIG. 7 represents the monitoring and reporting operations, beginning at operation 702 which represents waiting for the coverage enhancement information to be received from the network. For example, reporting may be periodic, aperiodic based on a network request (e.g., send a CSI report and receive coverage enhancement information in response), and it is also feasible for the user equipment to request the coverage enhancement report on demand. In any event, when received, operation 704 evaluates whether the coverage enhancement command was a query command or a first-time (since disabled or off) enable command, in which case coverage enhancement information is to be returned via operations 710, 712 and 714.

In the example of FIG. 7, if coverage enhancement data is received while monitoring in the enabled state, the coverage enhancement information is returned only if changed. This is represented by operations 706 and 708.

Operation 710 represents the terminal adapter building (e.g., formatting) the coverage enhancement information for the response as expected by the terminal equipment. Operation 712 sends the response including the coverage enhancement information to the terminal equipment. Operation 714 saves the current coverage enhancement state, for use in determining whether the coverage enhancement information changes in a subsequent communication from the network.

The process returns to operation 606 of FIG. 6. If coverage enhancement monitoring is enabled, then operation 702 continues to monitor, otherwise the process ends. Note that in this example, a query command returns the coverage enhancement information, but does not change the current enabled (report unsolicited if coverage enhancement change) or disabled state.

Figure 8:
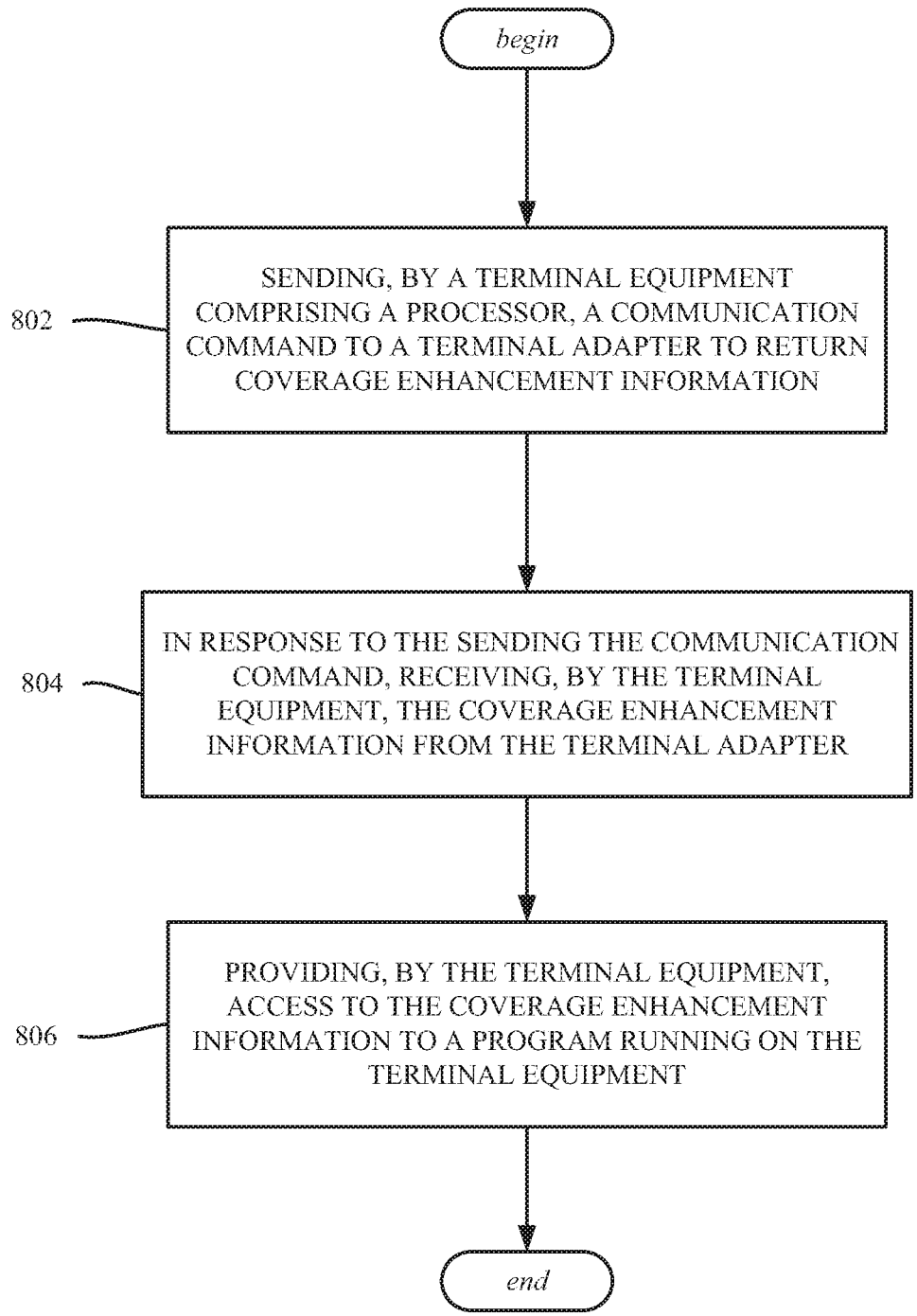
FIG. 8 illustrates a flow diagram directed towards example operations of a terminal equipment with respect to obtaining coverage enhancement information from a terminal adapter, in accordance with various aspects and implementations of the subject disclosure.

One or more aspects, generally represented in FIG. 8, represent example operations of a terminal equipment, comprising (operation 802) sending, by a terminal equipment comprising a processor, a communication command to a terminal adapter to return coverage enhancement information. Operation 804 represents, in response to the sending the communication command, receiving, by the terminal equipment, the coverage enhancement information from the terminal adapter. Operation 806 represents providing, by the terminal equipment, access to the coverage enhancement information to a program running on the terminal equipment.

Sending the communication command can comprise sending an enable command that activates coverage enhancement information reporting at the terminal adapter. Receiving the coverage enhancement information can comprise receiving a reply indicating that coverage enhancement is supported by a serving cell corresponding to a wireless network device coupled to the terminal adapter. Receiving the coverage enhancement information can comprise receiving a reply indicating that coverage enhancement is in use by a serving cell corresponding to a wireless network device coupled to the terminal adapter.

The communication command can comprise a first communication command, and aspects can comprise sending, by the terminal equipment, a second communication command to disable coverage enhancement information reporting.

Sending the communication command to the terminal adapter can comprise issuing an enable command corresponding to an attention command interface.

The coverage enhancement information can comprise first coverage enhancement information, and aspects can comprise, receiving, by the terminal equipment, second coverage enhancement information comprising modified coverage enhancement information from the terminal adapter different from coverage enhancement information.

Receiving the coverage enhancement information can comprise receiving at least one of: downlink repetition factor data for downlink wireless communications from a wireless network device coupled to the terminal adapter, or uplink repetition factor data for uplink wireless communications to the wireless network device coupled to the terminal adapter. Receiving the coverage enhancement information comprises receiving at least one of: carrier to interference plus noise ratio data, reference signal received power data, or user equipment state data.

Figure 9:
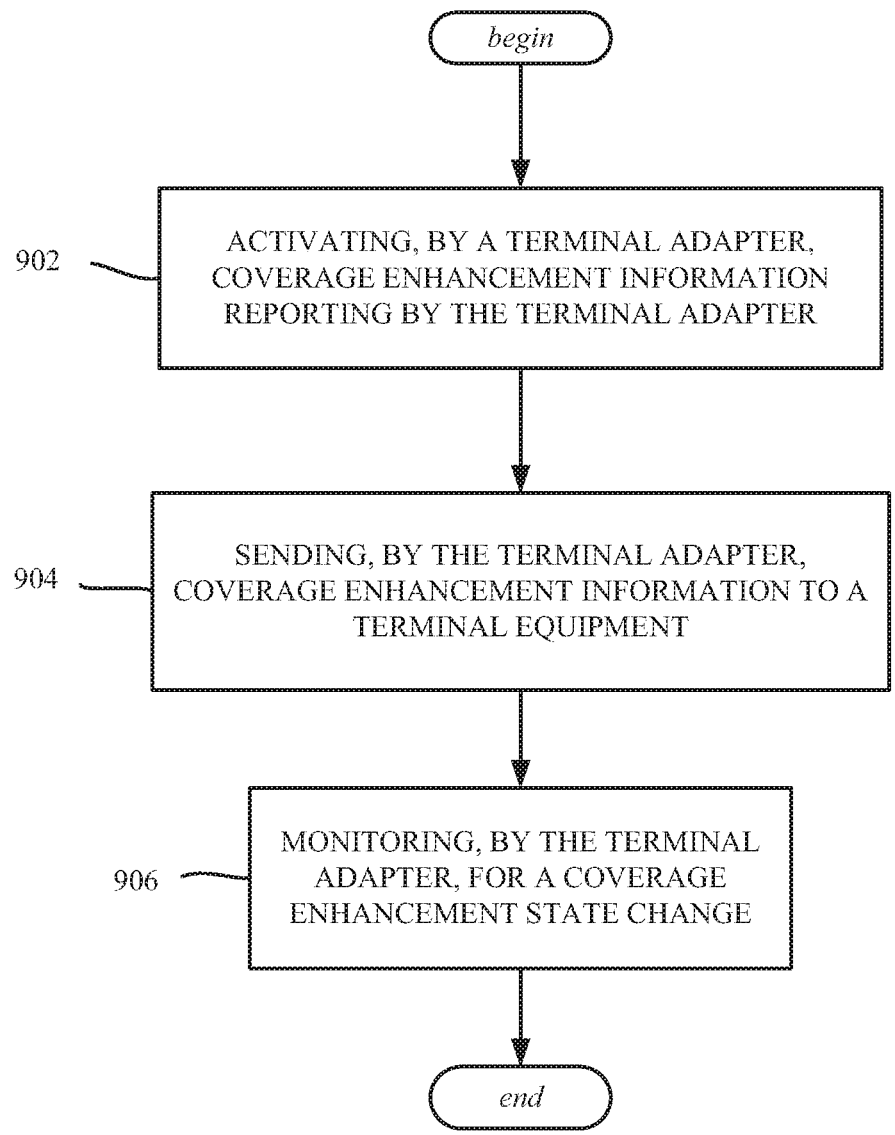
FIG. 9 illustrates a flow diagram directed towards example operations of a terminal adapter with respect to sending coverage enhancement information to a terminal equipment and monitoring for coverage enhancement information, in accordance with various aspects and implementations of the subject disclosure.

One or more aspects, generally represented in FIG. 9, represent example operations of a terminal adapter, comprising (operation 902) activating, by a terminal adapter, coverage enhancement information reporting by the terminal adapter. Operation 904 represents sending, by the terminal adapter, coverage enhancement information to a terminal equipment. Operation 906 represents monitoring, by the terminal adapter, for a coverage enhancement state change.

Aspects can comprise receiving user equipment state data indicating whether a user equipment is in a connected state, an idle state or a random access channel procedure state, determining a state transition based on the user equipment state data relative to a previous state of the user equipment, and in response to the determining the state transition, mapping a repetition factor to device physical layer parameters based on the user equipment state data.

Activating the coverage enhancement information reporting can occur in response to receiving an enable coverage enhancement reporting command from the terminal equipment. Aspects can comprise, in response to the monitoring, detecting, by the terminal adapter, a coverage enhancement state change, and, in response to the detecting, sending by the terminal adapter updated coverage enhancement information corresponding to the coverage enhancement state change to the terminal equipment.

Sending the updated coverage enhancement information can comprise sending an unsolicited communication to the terminal equipment. Sending the coverage enhancement information to the terminal equipment can comprise sending a communication indicating whether coverage enhancement is supported by a serving cell device corresponding to a wireless network device coupled to the terminal adapter, and/or whether coverage enhancement is in use by the serving cell device corresponding to the wireless network device coupled to the terminal adapter.

Sending the coverage enhancement information to the terminal equipment can comprise sending a communication indicating at least one of: downlink repetition factor data for downlink wireless communications from a wireless network device coupled to the terminal adapter, uplink repetition factor data for uplink wireless communications to the wireless network device coupled to the terminal adapter, carrier to interference plus noise ratio data, reference signal received power data, and/or user equipment state data.

Figure 10:
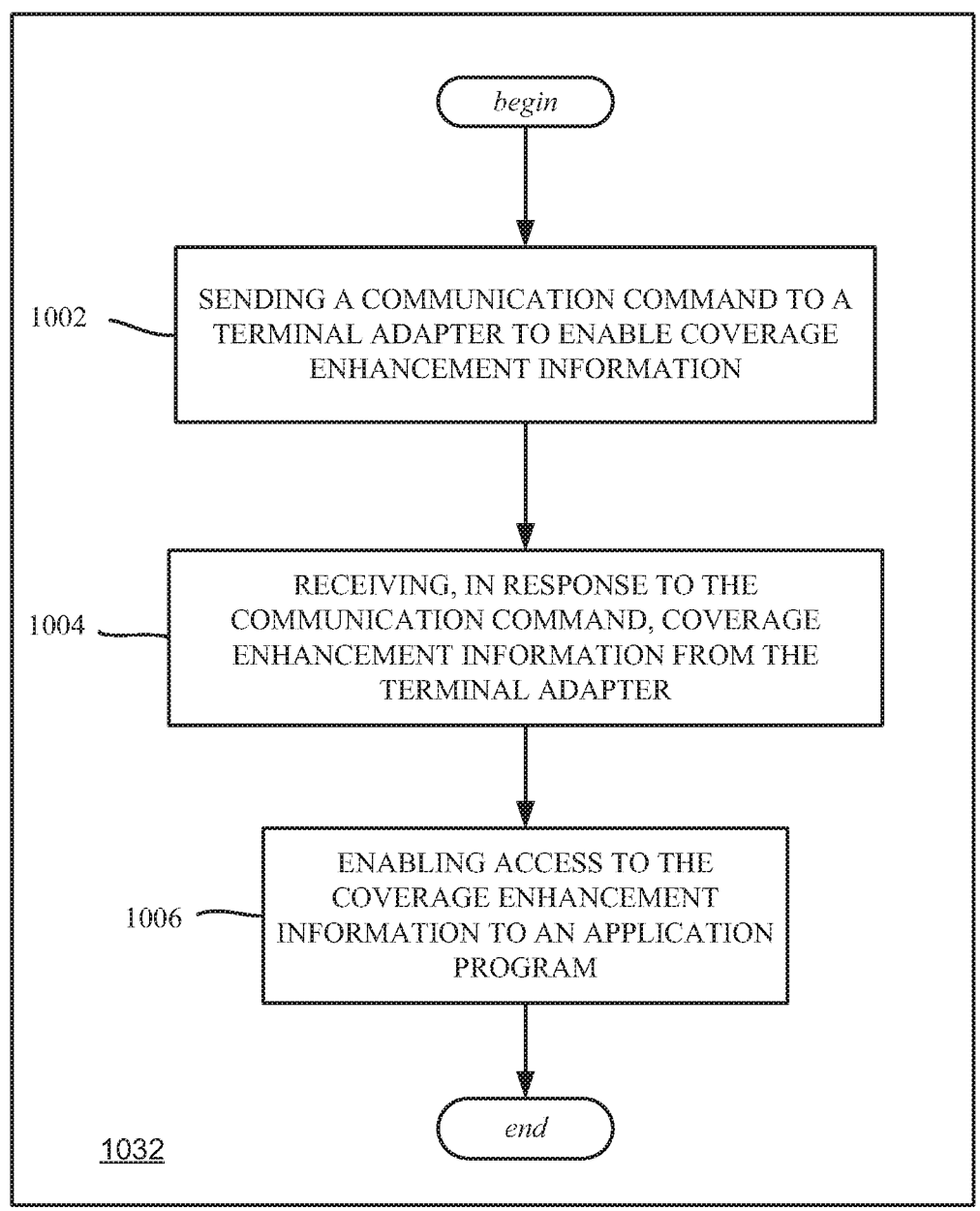
FIG. 10 illustrates a terminal equipment device with example operations performed thereby for obtaining coverage enhancement information from a terminal adapter, in accordance with various aspects and implementations of the subject disclosure.

FIG. 10 represents an example terminal equipment device 1032, e.g., comprising a processor and a memory that stores executable instructions that, when executed by the processor, facilitate performance of operations. Example operations can comprise sending a communication command to a terminal adapter to enable coverage enhancement information (operation 1002). Operation 1004 represents receiving, in response to the communication command, coverage enhancement information from the terminal adapter. Operation 1006 represents enabling access to the coverage enhancement information to an application program.

Receiving the coverage enhancement information from the terminal adapter communication can comprise receiving an indication that coverage enhancement is in use by a serving cell corresponding to a wireless network device coupled to the terminal adapter. Further operations can comprise, receiving updated coverage enhancement information from the terminal adapter, and enabling access to the updated coverage enhancement information to the application program. Receiving the updated coverage enhancement information from the terminal adapter can comprise receiving at least one of: changed downlink repetition factor data, or changed uplink repetition factor data. Receiving the updated coverage enhancement information from the terminal adapter can comprise receiving at least one of carrier to interference plus noise ratio data, reference signal received power data, or user equipment state data indicating whether a user equipment is in a connected state, an idle state or a random access channel procedure state.

As can be seen, transferring coverage enhancement information from a terminal adapter to a terminal equipment provides terminal equipment programs (e.g., applications) with access to the coverage enhancement information. As a result, an operating system or application in the terminal equipment can have improved functionality, such as more intelligent decision making with respect to recognizing types of failure and allowing coverage enhancement information to be a part of decision processing. Codec optimization is also a feasible, non-limiting example, e.g., in the cases of degraded data rate, terminal equipment behavior can select a more appropriate codec given constraints in transmission bandwidth. As another example, payload optimization/prioritization is feasible, in that a decision of content/frequency/size of payload(s) to be transmitted from the terminal equipment can take into account coverage enhancement information, which may constrain the frequency and size of transmitted data, such as to limit transmission to only data that is deemed critical in nature. Transmission of such critical data can be based on intelligent decision making, e.g., part of a decision making tree in terminal equipment software. As yet another example, the technology can facilitate optimizing the retransmission of payload, e.g., reduce individual payload size by breaking into parts to retransmit over a larger time span. The coverage enhancement information can be a basis for a decision to use a secondary access technology (e.g., GSM Circuit Switched) in scenarios where transmission bandwidth is not suitable for service (e.g., a voice call) on primary access technology (e.g., LTE-M). Power consumption modulation is another possible benefit, e.g., knowing coverage enhancement and retransmission demands can be used to modulate the transmission (e.g., caching in bursts and/or bundling into time). Coverage enhancement information can be provided to a user interface (if available), e.g., coverage enhancement information can be coupled or replayed to a user based on temporal knowledge of device (tilt, location, position, etc.) to allow the user to understand how and why coverage is better/worse in different locations; automation can be connected to this mode to help processes (e.g., robotic movement, turning and antenna, and so forth).

In general, having coverage enhancement information at the terminal equipment provides for a better experience for the UE device; the coordination of power use and optional inclusion of network state to a user can lead to longer device usage (e.g., battery life) and optimized applications. Having coverage enhancement information at the terminal equipment can facilitate better usage of bandwidth, e.g., the device and the network can experience better utilization of bandwidth by controlling payload sizes and retransmission according to device/network state. There can be an appropriate fallback to alternate transmissions, e.g., utilizing various data channels only when required can lead to optimal network performance in packing as many IoT devices into a single service tower. The technology described herein allows for prioritization of data on the device such that in knowingly poor network conditions, device can continue to get critical portions of data at reliable QoS and latency.

Figure 11:
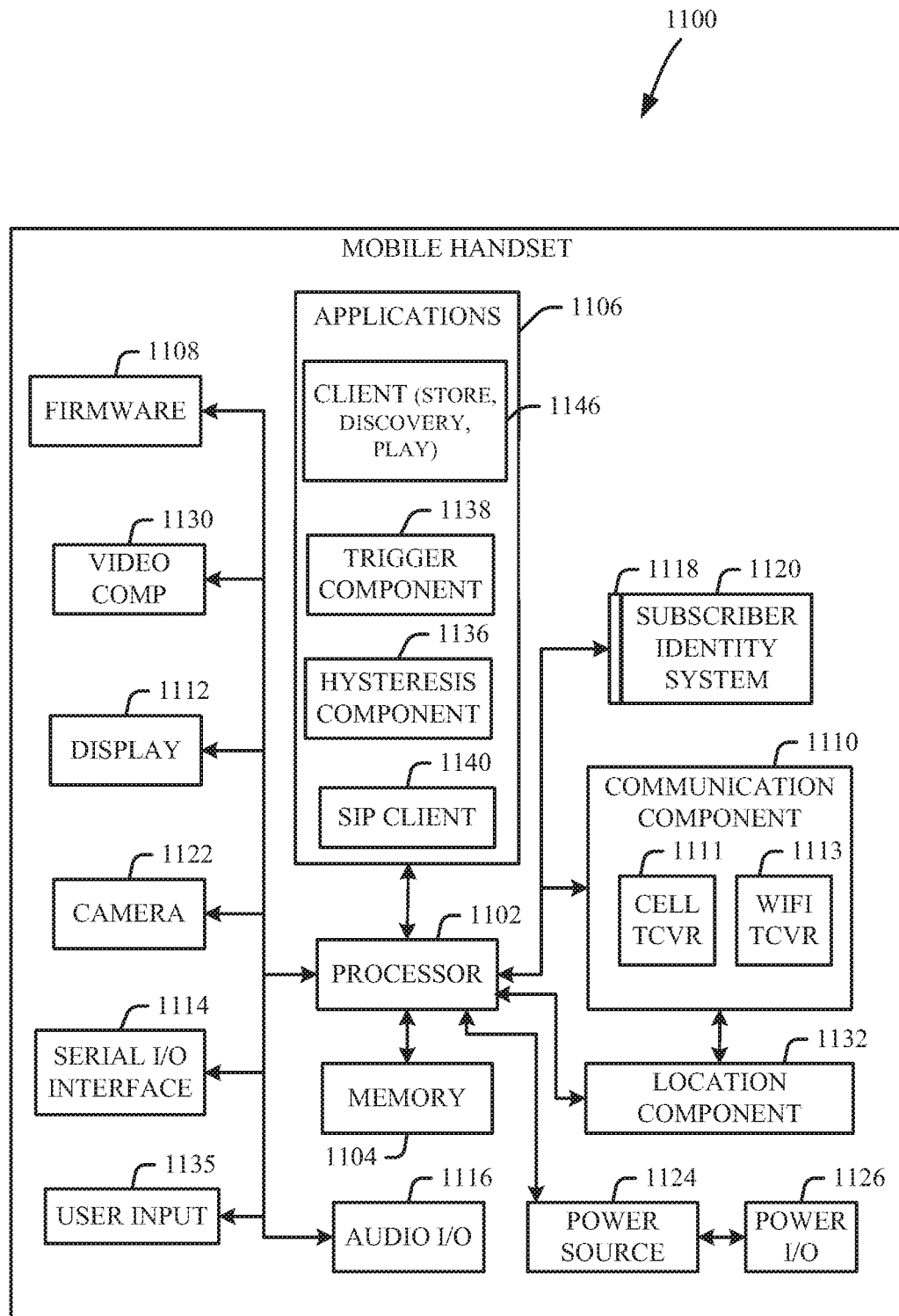
FIG. 11 illustrates an example block diagram of an example mobile handset operable to engage in a system architecture that facilitates wireless communications according to one or more embodiments described herein.

Referring now to FIG. 11, illustrated is an example block diagram of an example mobile handset 1100 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1194) through a hard-wire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communications component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or a decoded format.

A video processing component 1122 (e.g., a camera) can be provided for decoding encoded multimedia content. The video processing component 1122 can aid in facilitating the generation, editing, and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
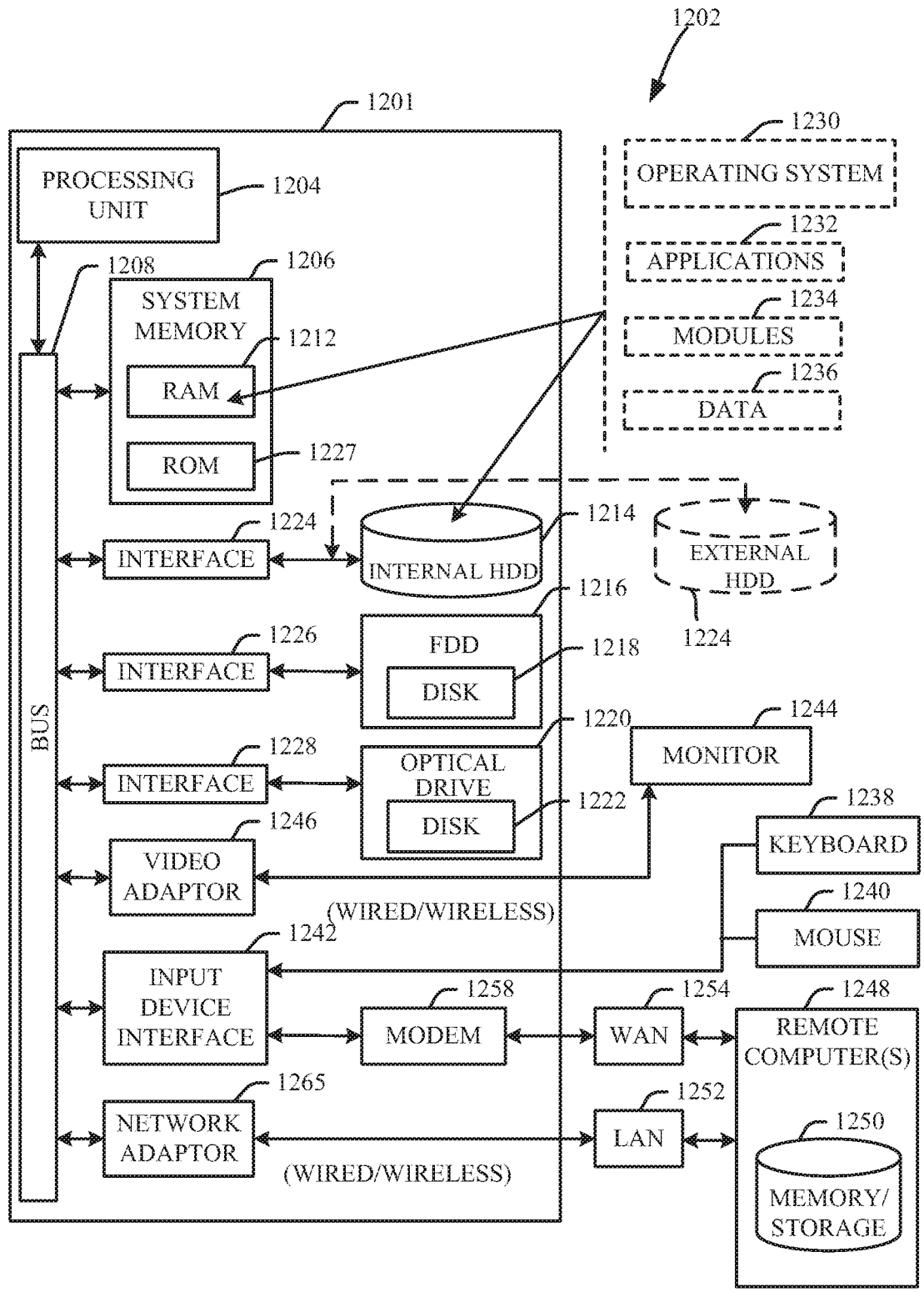
FIG. 12 illustrates an example block diagram of an example computer operable to engage in a system architecture that facilitates wireless communications according to one or more embodiments described herein.

Referring now to FIG. 12, illustrated is an example block diagram of an example computer 1200 operable to engage in a system architecture that facilitates wireless communications according to one or more embodiments described herein. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 12 is but one example of a computing device.

In order to provide a context for the various aspects of the disclosed subject matter, FIG. 12 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1220 (see below), non-volatile memory 1222 (see below), disk storage 1224 (see below), and memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 12 illustrates a block diagram of a computing system 1200 operable to execute the disclosed systems and methods in accordance with an embodiment. Computer 1212, which can be, for example, part of the hardware of system 1220, includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1216 can include volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 can also include removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be noted that the disclosed subject matter can be implemented with various operating systems or combinations of operating systems.

A user can enter commands or information into computer 1212 through input device(s) 1236. As an example, a mobile device and/or portable device can include a user interface embodied in a touch sensitive display panel allowing a user to interact with computer 1212. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1214 through system bus 1218 by way of interface port(s) 1238. Interface port(s) 1238 include, for example, a serial port, a parallel port, a game port, a universal serial bus (USB), an infrared port, a Bluetooth port, an IP port, or a logical port associated with a wireless service, etc. Output device(s) 1240 and a move use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, cloud storage, cloud service, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically connected by way of communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
    sending, by a terminal adapter of a user equipment comprising a processor, to a network equipment of a serving cell, a coverage enhancement report used by the network equipment to provide coverage enhancement information, the coverage enhancement information comprising an indication of whether the network equipment supports coverage enhancement;
    sending, by a terminal equipment of the user equipment, a communication command to the terminal adapter of the user equipment, which is not currently monitoring for the coverage enhancement information, to turn on the monitoring for the coverage enhancement information, wherein the monitoring comprises:
        receiving, by the terminal adapter from the network equipment, the coverage enhancement information, and
        sending, by the terminal adapter, the coverage enhancement information to the terminal equipment during the monitoring and only in response to the terminal adapter determining that the coverage enhancement information has changed from previous coverage enhancement information sent to the terminal equipment;
    receiving, by the terminal equipment, the coverage enhancement information from the terminal adapter; and
    providing, by the terminal equipment, access to the coverage enhancement information to a program running on the terminal equipment.

2. The method of claim 1, wherein the sending comprises sending an enable command that activates coverage enhancement information reporting at the terminal adapter.

3. The method of claim 1, wherein the coverage enhancement information indicates that the network equipment supports the coverage enhancement.

4. The method of claim 1, wherein the coverage enhancement information indicates that the coverage enhancement is in use by the network equipment.

5. The method of claim 1, wherein the communication command is a first communication command, and further comprising, sending, by the terminal equipment, a second communication command to disable coverage enhancement information reporting.

6. The method of claim 1, wherein the sending comprises issuing an enable command corresponding to an attention command interface.

7. The method of claim 1, wherein the coverage enhancement information is first coverage enhancement information, and further comprising, receiving, by the terminal equipment, second coverage enhancement information comprising modified coverage enhancement information from the terminal adapter different from the first coverage enhancement information.

8. The method of claim 1, wherein the coverage enhancement information comprises at least one of: downlink repetition factor data for downlink wireless communications from a network, uplink repetition factor data for uplink wireless communications to the network equipment, carrier to interference plus noise ratio data, reference signal received power data, or user equipment state data.

9. A method, comprising:
    sending, by a terminal adapter of a user equipment comprising a processor, to a network equipment of a serving cell, a coverage enhancement report used by the network equipment to provide coverage enhancement information, the coverage enhancement information comprising an indication of whether the network equipment supports coverage enhancement; and
    activating, by the terminal adapter, monitoring for the coverage enhancement information in response to the terminal adapter receiving a command to turn on monitoring from a terminal equipment of the user equipment, wherein the monitoring comprises:
        receiving, by the terminal adapter from the network equipment, the coverage enhancement information, and
        sending, by the terminal adapter, the coverage enhancement information to the terminal equipment of the user equipment during the monitoring and only in response to the terminal adapter determining that the coverage enhancement information has changed from previous coverage enhancement information sent to the terminal equipment.

10. The method of claim 9, further comprising receiving, by the terminal adapter, user equipment state data indicating whether the user equipment is in a connected state, an idle state or a random access channel procedure state, determining, by the terminal adapter, a state transition based on the user equipment state data relative to a previous state of the user equipment, and, in response to the determining the state transition, mapping, by the terminal adapter, a repetition factor to device physical layer parameters based on the user equipment state data.

11. The method of claim 9, wherein the coverage enhancement information indicates that the coverage enhancement is in use by the network equipment.

12. The method of claim 9, further comprising, in response to the monitoring, detecting, by the terminal adapter, a coverage enhancement state change, and, in response to the detecting, sending, by the terminal adapter, updated coverage enhancement information corresponding to the coverage enhancement state change to the terminal equipment.

13. The method of claim 12, wherein sending the updated coverage enhancement information comprises sending an unsolicited communication to the terminal equipment.

14. The method of claim 9, wherein the coverage enhancement information indicates that the network equipment supports the coverage enhancement.

15. The method of claim 9, wherein the coverage enhancement information comprises at least one of: downlink repetition factor data for downlink wireless communications from the network equipment, uplink repetition factor data for uplink wireless communications to the network equipment, carrier to interference plus noise ratio data, reference signal received power data, or user equipment state data.

16. A user equipment, comprising:
- a terminal equipment;
- a terminal adapter;
- a processor; and
- a memory that stores executable instructions that, when executed by the processor, facilitate performance of operations, the operations comprising:
  - sending, by the terminal adapter to a network equipment of a serving cell, a coverage enhancement report used by the network equipment to provide coverage enhancement information, the coverage enhancement information comprising an indication of whether the network equipment supports coverage enhancement;
  - sending, by the terminal equipment, a communication command to the terminal adapter that is not currently monitoring for the coverage enhancement information, wherein the communication command instructs the terminal adapter to turn on monitoring for the coverage enhancement information, wherein the monitoring comprises:
    - receiving, by the terminal adapter from the network equipment, the coverage enhancement information, and
    - sending, by the terminal adapter, the coverage enhancement information to the terminal equipment during the monitoring and only in response to the terminal adapter determining that the coverage enhancement information has changed from previous coverage enhancement information sent to the terminal equipment;
  - receiving, by the terminal equipment, in response to the communication command, the coverage enhancement information from the terminal adapter; and
  - enabling, by the terminal equipment, access to the coverage enhancement information to an application program running on the user equipment.

17. The user equipment of claim 16, wherein the coverage enhancement information indicates that the second device supports the coverage enhancement.

18. The user equipment of claim 16, wherein the operations further comprise, receiving, by the terminal equipment, updated coverage enhancement information from the terminal adapter, and enabling, by the terminal equipment, access to the updated coverage enhancement information to the application program.

19. The user equipment of claim 18, wherein receiving the updated coverage enhancement information from the terminal adapter comprises receiving at least one of: changed downlink repetition factor data, or changed uplink repetition factor data.

20. The user equipment of claim 18, wherein receiving the updated coverage enhancement information from the terminal adapter comprises receiving at least one of: carrier to interference plus noise ratio data, reference signal received power data, or user equipment state data indicating whether the user equipment is in a connected state, an idle state or a random access channel procedure state.

* * * * *